(12) United States Patent
Matsuda (10) Patent No.: US 6,891,643 B1
(45) Date of Patent: May 10, 2005

(54) IMAGING DEVICE AND IMAGING METHOD (75) Inventor: Shinya Matsuda, Takarazuka (JP)

(73) Assignee: Minolta Co., Ltd., Osaka (JP)

( * ) Notice: Subject to any disclaimer, the term of this patent is extended or adjusted under 35 U.S.C. 154(b) by 896 days.

(21) Appl. No.: 09/711,150

(22) Filed: Nov. 14, 2000

(30) Foreign Application Priority Data

Nov. 15, 1999 (JP) ............................................ 11-324359

(51) Int. Cl.⁷ .............................. H04N 1/04; G06K 9/36
(52) U.S. Cl. ........................ 358/471; 358/497; 358/495; 382/287
(58) Field of Search ................................ 358/474, 486, 358/471, 409.1, 497, 493, 495; 382/287, 275

(56) References Cited

U.S. PATENT DOCUMENTS

| 5,663,806 A | * | 9/1997 | Grise et al. | 358/406 |
| 5,995,245 A | * | 11/1999 | Moro | 358/474 |
| 6,014,470 A | * | 1/2000 | Matsuda | 382/275 |

FOREIGN PATENT DOCUMENTS

| JP | 7-38793 | 2/1995 |
| JP | 7-107379 | 4/1995 |
| JP | 8-265628 | 10/1996 |

\* cited by examiner

*Primary Examiner*—Edward Coles
*Assistant Examiner*—Jason Sherrill
(74) *Attorney, Agent, or Firm*—McDermott, Will & Emery (57) ABSTRACT

The imaging device divides the two-dimensional photo object into multiple sections before performing imaging, and obtains an ultra-high resolution complete image by splicing together the partial images of the photo object. To this end, in the imaging device, the area sensor is held essentially parallel to the photo object, and the imaging lens is moved such that its optical axis L draws a circle with the normal line N that passes trough the center of the area sensor 20 as the center of the circle. The imaging lens is stopped at each of the positions at which the imaging optical system optical axis that connects the center of the area sensor and the principal point of the imaging lens passes through the imaging center point of each section of the photo object, in order to perform imaging of each section of the photo object.

18 Claims, 8 Drawing Sheets

IMAGING DEVICE AND IMAGING METHOD

This application is based on application No. 11-324359 filed in Japan, the contents of which is hereby incorporated by reference.

BACKGROUND OF THE INVENTION

1. Field of the Invention

The present invention pertains to an imaging device and imaging method that divide a two-dimentional photo object, such as a document or photo, into multiple parts, take their images, and splice the obtained image data of the sections to obtain a high-resolution complete image.

2. Description of the Related Art

As an imaging device that divides the photo object into multiple parts, take their images, and splices the image data of the sections to obtain a complete image, the following devices are conventionally known.

One such device is a device that has two mirrors in the light path between the area sensor and the photo object, and the photo object image is divided into multiple parts and projected onto the area sensor by rotating these mirrors in the X and Y directions, respectively (see Japanese Laid-Open Patent Application Hei 8-265628).

Another such device moves the area sensor relative to the complete photo object image projected by means of the optical system and reads the photo object image by dividing it into multiple parts (see Japanese Laid-Open Patent Application Hei 7-107379).

Where the mirrors are rotated as in the former example, the mirrors are located such that they are angled relative to the optical axis of the imaging optical system, and the photo object image is sequentially projected onto the area sensor while the angles of the mirrors are caused to change from time to time. Consequently, mirrors having a large surface area are needed. In addition, since space in which the mirrors may be rotated is needed, the entire imaging device becomes large in size. Furthermore, as the mirrors rotate, the photo object becomes no longer parallel to the imaging element, resulting in the so-called tilt state. As a result, blur and distortion occur in the image formed on the imaging element. Further, because the photo object is moved in a two-dimensional fashion, the two mirrors must be individually rotated, which futher contributes to increasing the size of the entire imaging device, as well as to increased image blur and distortion.

Where the area sensor is moved as in the latter example, the area sensor must be moved within the same plane, but in actuality it is difficult to completely eliminate rattling of the drive mechanism due to gear backlash, etc. Therefore, the area sensor does not move within the same plane in a parallel fashion, due to the rattling of the drive mechanism. In other words, the area sensor rotates slightly around the optical axis of the imaging optical system, and thus the obtained images of sections of the photo object or partial images are rotated relative to the images of other sections. If the partial images are rotated relative to each other, when two or more of them are spliced together, the image data positions must be corrected, but detection of the amount of rotation of the area sensor or the images, as well as correction of the image data, is very complex and difficult. Therefore, using these conventional constructions, the problems arise that the entire imaging device increases in size and cost, and that the processing required for the splicing of partial images becomes complex.

OBJECTS OF SUMMARY

The object of the present invention is to provide an improved imaging device and imaging method.

Another object of the present invention is to provide an imaging device and imaging method that allow easy splicing of partial images.

Yet another object of the present invention is to provide an imaging device that is compact in size and low in cost, and using which high-resolution images may be obtained.

In order to attain these and other objects, according to one aspect of the present invention, the imaging device has an imaging sensor, an imaging lens that projects the photo object image onto the imaging sensor, and a moving mechanism that moves the imaging lens in a direction perpendicular to its optical axis, wherein the imaging lens is moved to multiple imaging positions by means of the moving mechanism and the photo object image is taken at each of the imaging positions in order to obtain partial images or images of sections of the photo object.

According to another aspect of the present invention, in the imaging device described above, the moving mechanism moves the imaging lens in a circle having as its center the center of the imaging sensor.

According to yet another aspect of the present invention, the imaging lens comprises a zoom lens and the moving mechanism adjusts the radius of the circle referred to above in response to the imaging magnification of the imaging lens.

According to yet another aspect of the present invention, the imaging device furthermore has a table to hold the photo object and a stopper to position the photo object at a prescribed position on the table, and the prescribed position and the imaging position have a certain positional relationship at all times.

BREIF DESCRIPTION OF THE DRAWINGS

These and other objects and features of the present invention will become apparent from the following description of a preferred embodiment thereof taken in conjunction with the accompanying drawings, in which.

In the following description, like parts are designated by like reference numbers throughout the several drawings.

DETAILED DESCRIPTION OF THE PREFFERED EMBODIMENTS

Figure 1:
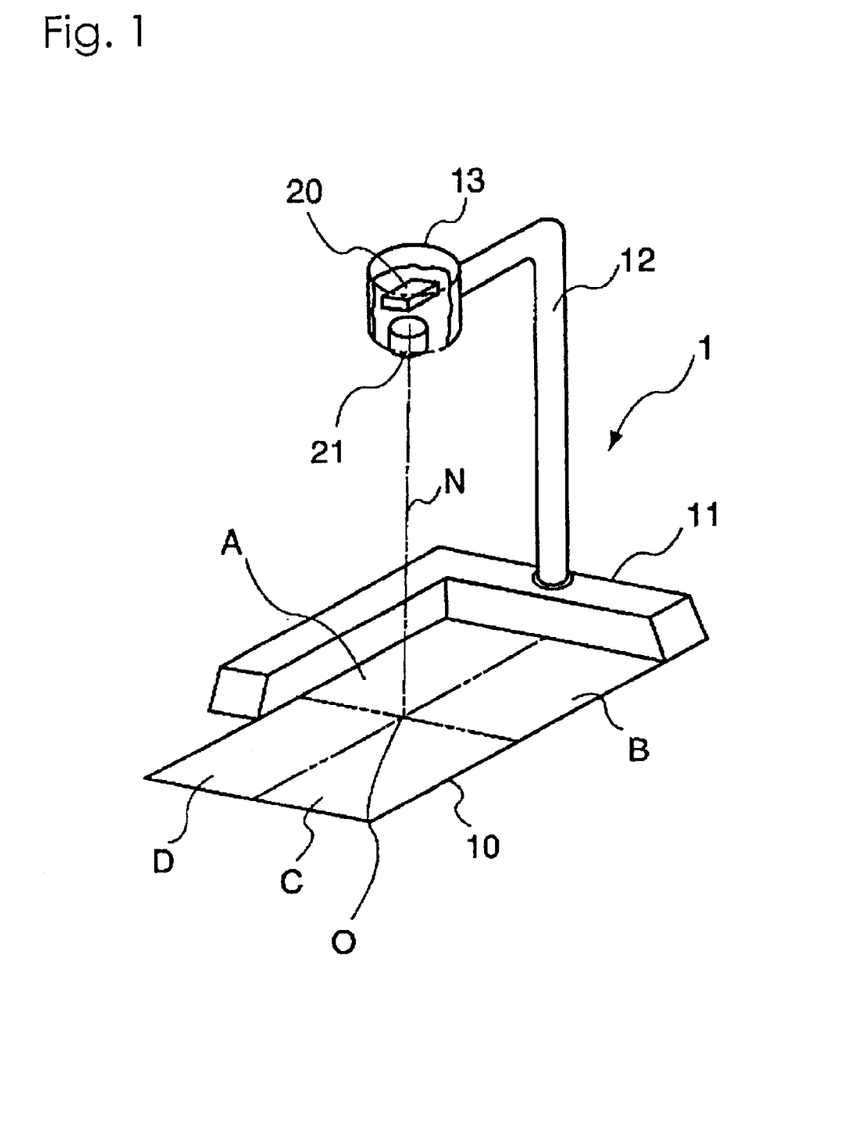
FIG. 1 is a perspective view showing the external construction of an imaging device.

FIG. 1 shows the external construction of an imaging device. The imaging device 1 comprises a table 10 to hold the photo object, a main unit 11 that is in contact with two sides of the table and the housing for which also functions as a stopper to position the photo object, a support shaft 12 that vertically rises from the main unit 11 and is bent to extend toward the center of the table 10 such that it is essentially parallel to the table 10, and an imaging unit 13 that is located at the tip of the support shaft 12 and faces the center O of the table 10. A control circuit is located inside the main unit 11.

Figure 2:
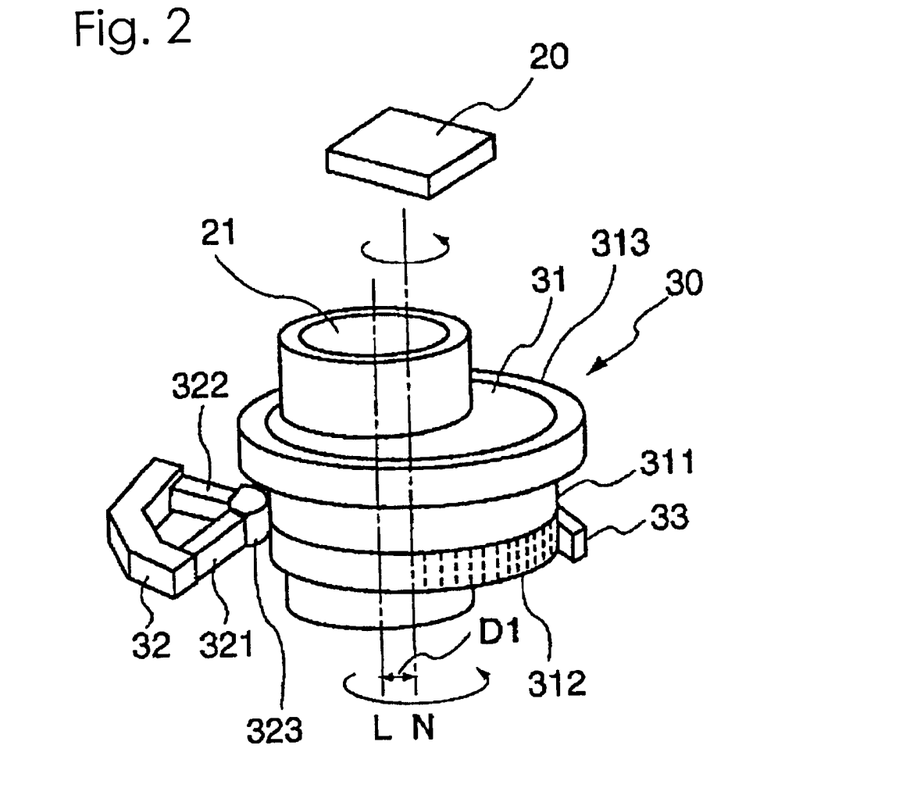
FIG. 2 is a perspective view showing the moving mechanism of the imaging lens used in the imaging device.

Inside the imaging unit 13 are located, for example, a two-dimensional imaging element (area sensor) 20 such as a CCD (charge coupled device), an imaging lens 21, and a moving mechanism to move the imaging lens 21 (see FIG. 2). The length of the support shaft 12 and the mounting position of the imaging unit 13 are adjusted such that the normal line N that passes through the center of the light receiving surface of the area sensor 20 and crosses the light receiving surface at a right angle matches the normal line that passes through the center of the table 10. The control circuit converts the image data (analog signals) obtained by means of the area sensor 20 into digital signals, corrects the brightness and gradation characteristics of the image data, and splices the image data, which is described below.

In this imaging device, the area sensor 20 is fixed so that it faces the center O of the table 10, and by moving the imaging lens 21, the photo object placed on the table 10 is divided into multiple sections (sections A through D) and undergoes imaging.

FIG. 2 shows the details of the moving mechanism. The moving mechanism 30 comprises a disk-like rotor 31 that rotates around the normal line N that passes through the center of the light receiving surface of the area sensor 20, an actuator 32 that rotates the rotor 31, and a position sensor 33 to detect the angle of rotation of the rotor 31. The imaging lens 21 is mounted to the rotor 31 such that its optical axis L is parallel to and located at a prescribed distance D1 from the normal line N. In other words, when the rotor 31 is rotated with the normal line N as the axis of rotation, the imaging lens 21 revolves as if its optical axis L drew a circle having a radius D1 with the normal line N as the center of the circle. The upper edge area of the rotor 31 is supported by a ring-shaped bearing 313 that is fixed to the main unit of the imaging unit 13.

For the actuator 32, a truss-type piezoelectric actuator is used, for example. A truss-type piezoelectric actuator uses two piezoelectric elements 321 and 322 as position changing elements, which are located such that their directions of expansion and contraction create a certain angle (90 degrees, for example), and a chip member 323 that functions as a drive member is located at the intersection point between the two piezoelectric elements. By driving the piezoelectric elements 321 and 322 by means of drive signals such as sine wave signals having a prescribed phase difference, the chip member 323 is driven such that it draws an oval or circular locus. When this actuator 32 is pushed toward the sidewall 311 of the rotor 31 with a prescribed pressure, the chip member 323 intermittently comes into contact with the sidewall 311 of the rotor 31 when the chip member 323 is driven while drawing a oval or circular locus. Meanwhile, due to the friction that exists between the sidewall 311 and the chip member 323, the rotor 31 is driven in a prescribed direction together with the chip member 323. Through the repeated application of a drive signal to the piezoelectric elements 321 and 322, the chip member 323 is driven on a continuous basis, so that the rotor 31 is intermittently driven in a prescribed direction with minute angular changes. Consequently, the rotor 31 rotates with the normal line N as the center of rotation.

For the position sensor 33, a magnetic sensor such as a magnetic resistive (MR) element, for example, is used. The circumference 312 of the lower end area of the rotor 31 is alternately polarized to have N and S polarities, and the position sensor 33 detects the angle of rotation of the rotor 31 from the number of N poles and S poles that pass in front of it. The control circuit in the main unit 11 can stop the imaging lens 21 at any desired position by controlling the actuator 32 based on the detection signals from the position sensor 33.

Figure 3:
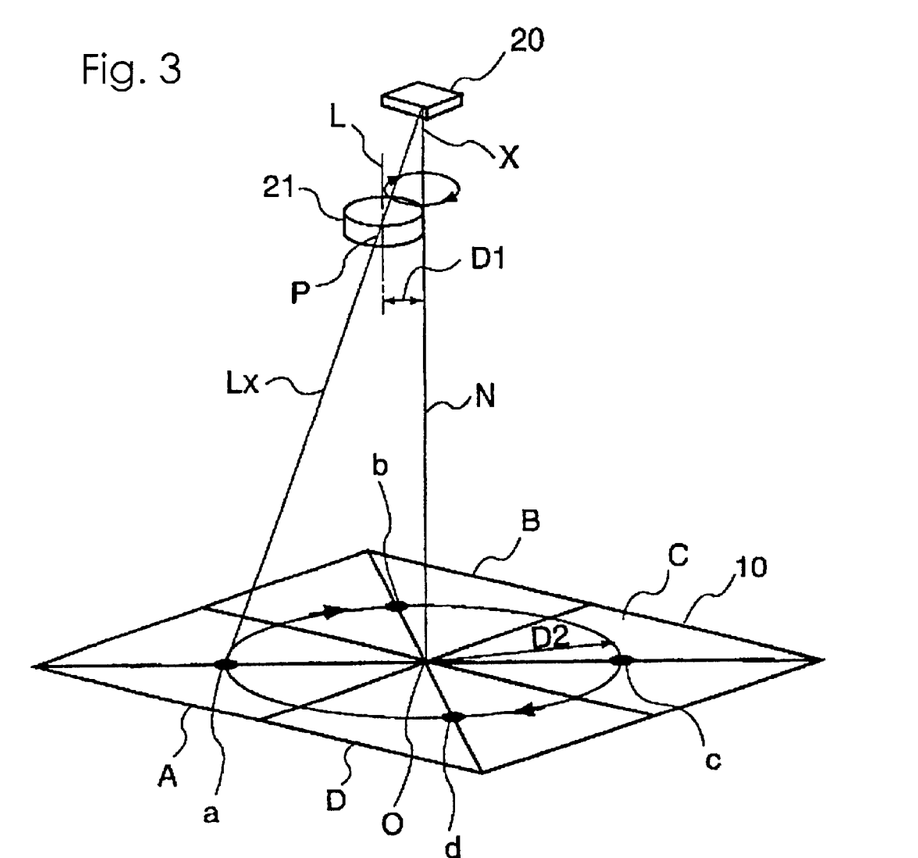
FIG. 3 is a drawing showing the positional relationships among the photo object placed on the table of the imaging device, the imaging sensor and the imaging lens.

FIG. 3 shows the positional relationships among the area sensor 20, the imaging lens 21 and the photo object placed on the table 10. The photo object on the table 10 is divided into four sections A through D, the sections A through D undergo imaging, and the image data for the entire photo object is created by splicing together the image data for each section. Therefore, the imaging lens 21 is stopped at each of the imaging positions at which the axis Lx (the optical axis of the imaging optical system that connects the center of the area subjected to imaging and the center of the imaging element), which connects the center point (x) of the area sensor 20 and the principal point (p) of the imaging lens, passes through the imaging center points (a) through (d) of each section A through D.

As described above, because the imaging lens 21 is driven such that its optical axis L draws a circle that has a radius D1 and has the normal line N as the center of the circle, the locus of the intersection points between the optical axis Lx of the imaging optical system and the photo object draws a circle of a radius D2 that has the normal line N as the center of the circle. The relationship between the radius D1 and the radius D2 is determined by a geometric relationship. On the other hand, the imaging center points (a) through (d) of the sections A through D are determined by the maximum size of the photo object that may be input using this imaging device 1, i.e., the size of the table 10. In addition, the focal length or imaging magnification of the imaging lens 21 is determined by the size of the sections A through D and the area of the area sensor 20 that may be used for imaging. Therefore, the radius D2 is determined based on the fact that the imaging center points (a) through (d) of the sections A through D must be on the same circumference of the circle that has the normal line N as the center of circle, and then the radius D1 is determined from the focal length, etc. of the imaging lens 21. As described below, the imaging lens 21 shoots the image of an area that is slightly larger than each section A through D in order to identify the same image data during image splicing. Therefore, the imaging center points (a) through (d) of the sections A through D do not match the physical centers of the sections A through D, respectively.

Figure 4:
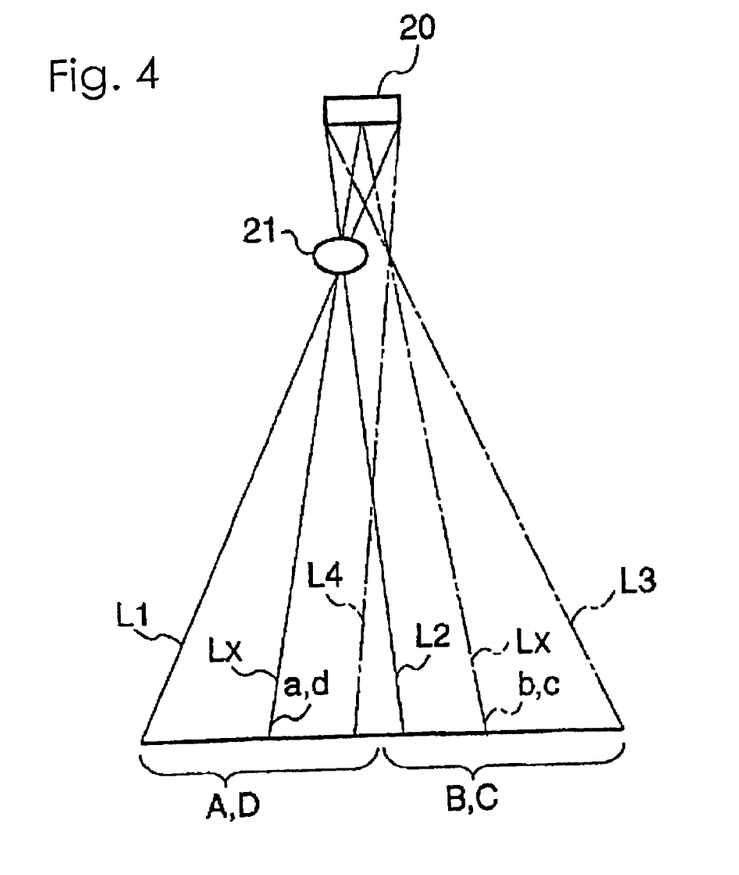
FIG. 4 is a drawing showing the light path in the imaging device when a specific section of the photo object undergoes imaging.

FIG. 4 shows the light path when the image of section A or section D is captured by means of the imaging lens 21, for example. The light beams L1 and L2 indicated by solid lines in FIG. 4 indicate the light beams that strike either end of the imaging area of the area sensor 20 when the imaging lens 21 is stopped such that the optical axis Lx of the imaging optical system passes through the imaging center point (a) or (d). Similarly, the light beams L3 and L4 indicated by chain lines indicate the light beams that strike either end of the imaging area of the area sensor 20 when the imaging lens 21 is stopped such that the optical axis Lx of the imaging optical system passes through the imaging center point (b) or (c).

As can be seen from FIG. 4, the area sensor 20 captures the image of an area that is larger than each section A through D, so that the image of the area to the left of the light beam L2 and to the right of the light beam L4 is captured twice in an overlapping fashion. This is true not only between the sections A and B and the sections D and C, but also between the sections A and D and the sections B and C. The control circuit located inside the main unit 111 compares the brightness distribution, etc. of the image data for the overlapping areas in the image data for the sections A through D, and looks for areas having the same pattern. The four sets of image data are then spliced together such that the areas having the same pattern overlap. The details of this image data splicing are disclosed in Japanese Laid-Open Patent Application Hei 7-38793, for example, and will therefore not be explained here.

As seen with reference to FIGS. 1 through 4, the area sensor 20 is fixed relative to the table 10, as well as to the photo object placed on it, and the imaging lens 21 revolves within a plane that is perpendicular to its optical axis L. Therefore, as shown in FIG. 4, the sections A through D, which are the photo objects, and their images formed on the area sensor 20 are parallel to each other, so that image blur and distortion are very small. In addition, as shown in FIG. 2, the moving mechanism 30 needs to separate the imaging lens 21 only by a distance D1 from the normal line N that passes through the center of the area sensor 20, and compared with the situation in which the entire imaging unit 13 is moved, the moving mechanism 30 is made simple in construction and small in size. The entire imaging device 1 is also reduced in size and cost.

As shown in FIG. 1, the main unit 11 that also functions as a positioning stopper for the photo object is located such that it is in contact with two sides of the section A. Therefore, in the general use of this imaging device, a two-dimensional photo object such as a document or photograph is placed on the table 10 such that it is in contact with the main unit 11. The imaging lens 21 is then initially stopped such that the optical axis Lx of the imaging optical system is positioned at the imaging center point (a) (this position is deemed the imaging start position), and the section A undergoes imaging. Subsequently, the imaging lens 21 is stopped such that the optical axis Lx of the imaging optical system is sequentially positioned at the imaging center points (b), (c) and (d), so as to capture the images of the sections B, C and D, respectively. The position of the photo object may be determined using the center O of the table 10 as the reference point.

Where the size of the photo object is essentially equal to or smaller than that of each section A through D, the photo object is placed such that it is in contact with the main unit 11, which is the positioning stopper, and the image of the photo object is captured by means of the area sensor 20 only once without moving the imaging lens 21, which is kept at the imaging start position. In this case, no image data splicing takes place.

Figure 5:
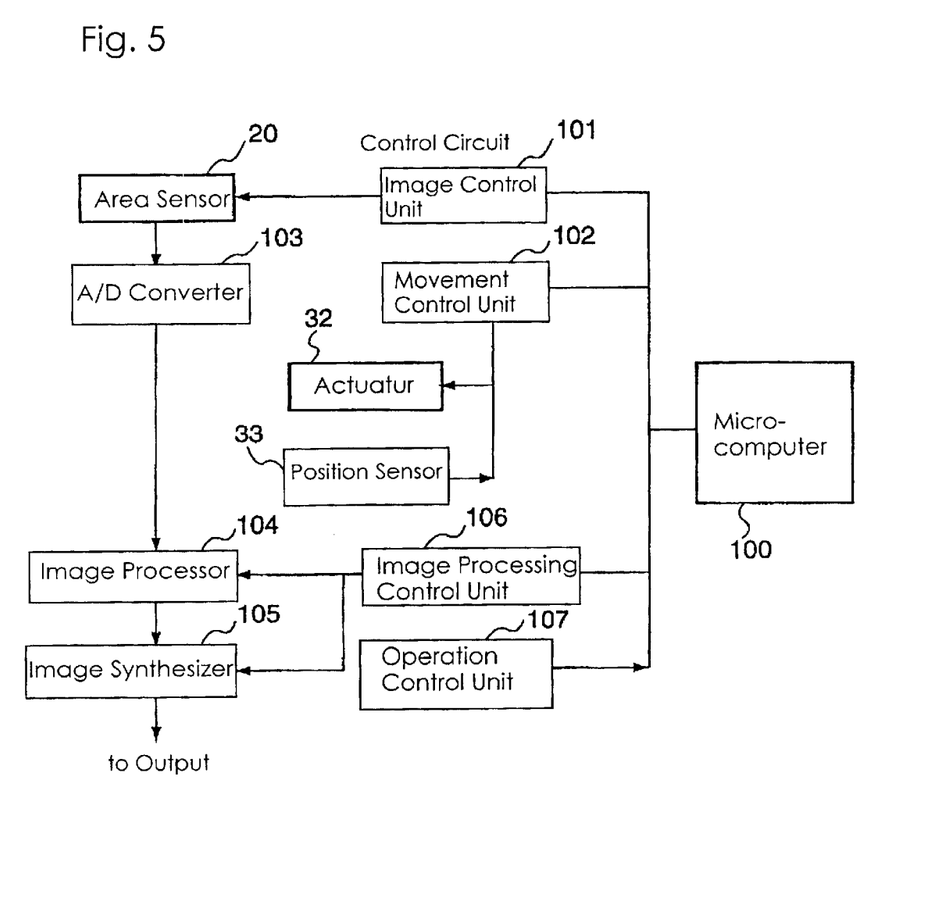
FIG. 5 is a block diagram showing the control circuit of the imaging device.

FIG. 5 shows a block diagram of the control circuit of the imaging device 1. In FIG. 5, the components other than the area sensor 20, actuator 32 and position sensor 33 comprise the control circuit. The control circuit includes an A/D converter, a microcomputer, a ROM and a RAM. Here, the functions executed by the microcomputer are shown as blocks 100, 101, 102, 104, 105, 106 and 107.

The overall control unit 100 controls the overall operation of the imaging device 1. The imaging control unit 101 controls the commencement of imaging by the area sensor 20 and the commencement of the output of the image data obtained. The movement control unit 102 controls the driving and stopping of the actuator 32. Because a truss-type piezoelectric actuator is used for the actuator 32, the movement control unit 102 controls the commencement and cessation of two sine wave drive signals having a prescribed phase difference. Since the order of imaging of the sections A through D of the photo object is predetermined, it is not necessary to change the direction of driving of the actuator, but where the configuration of the photo object is oblong in a vertical or horizontal direction, the direction of driving of the actuator may be changed at any time so that imaging may be performed efficiently.

The A/D converter 103 converts the analog image data from the area sensor 20 into prescribed digital image data, and outputs it to the image processor 104. The image processor 104 carries out, in accordance with the control signals from the image processing control unit 106, prescribed corrections to the digital image data obtained as a result of the conversion, including correction of the variations in transmission rate of the R, G and B filters and in the sensitivity of the area sensor 20 with regard to each color, in order to adjust the output signal level. The digital image data corrected by the image processor 104 is input to the image synthesizer 105, and is temporarily stored in the RAM until all image data covering the sections A through D are obtained. The image synthesizer 105 compares the brightness distribution, etc. of the digital image data for the overlapping areas in the images of the sections A through D in order to identify areas having the same pattern, and the sets of digital image data corresponding to each section A through D are spliced together such that the areas having the same pattern are overlapped in order to create a single complete set of image data.

The image processing control unit 106 controls the operation timing for the image processor 104 and the image synthesizer 105 based on the signals from the position sensor 33 and the control signals for the area sensor 20 output from the imaging control unit 101, and where digital image data is corrected by the image processor 104, it reads the correction coefficient that is sought in advance through calibration and stored in the ROM, and outputs it to the image processor 104. The operation control unit 107 is connected to a switch located on the main unit 11, for example, and determines whether or not a start signal for imaging operation has been input by the user.

Figure 6:
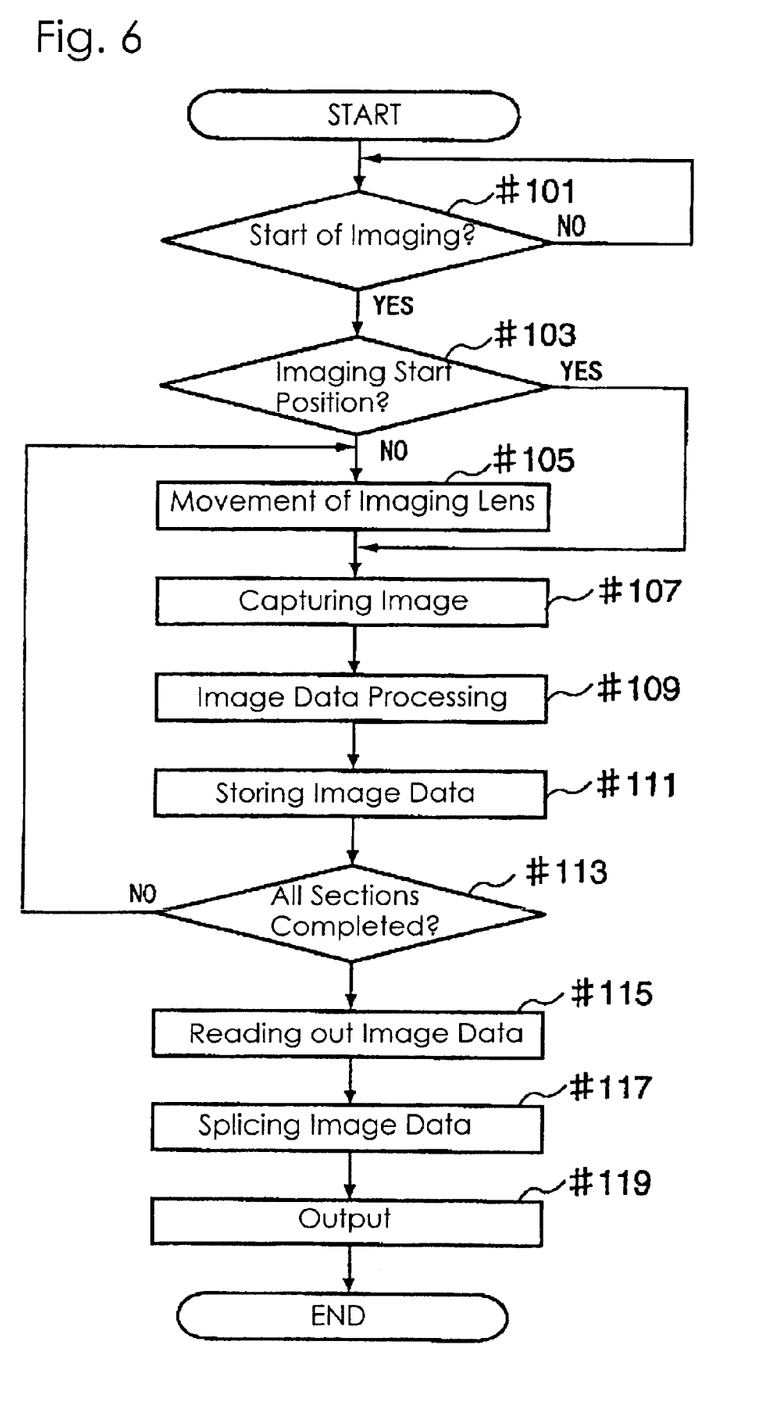
FIG. 6 is a flow chart showing the control sequence of the imaging operation of the imaging device.

The control sequence for the imaging operation carried out by the imaging device 1 will now be explained with reference to the flow chart of FIG. 6.

When the main switch (not shown in the drawing) on the main unit 11 of the imaging device 1 is turned ON, the operation control unit 107 determines whether or not an imaging start signal has been input by the user (step #101). When an imaging start signal has been input (YES in step #101), the movement control unit 102 determines whether or not the optical axis Lx of the imaging optical system passes through the imaging start position, i.e., the imaging center point (a) of the section A (step #103). Where the optical axis Lx of the imaging optical system does not pass through the imaging start position (NO in step #103), the movement control unit 102 generates prescribed drive signals while monitoring the output signals from the position sensor 33, and by impressing these drive signals to the actuator 32, moves the imaging lens 21 such that the optical axis Lx of the imaging optical system will pass through the imaging start position (step #105).

Where the optical axis Lx of the imaging optical system passes through the imaging start position from the start (YES in step #103) or where the imaging lens 21 has been moved to the imaging start position in step #105, the imaging control unit 101 controls the area sensor 20 and captures the image of the section A (step #107). When the imaging by the area sensor 20 is completed, image processing such as conversion of the analog image data into digital image data by the A/D converter 103 and correction of the digital image data by the image processor 104 is carried out (step #109), and the processed digital image data is temporarily stored in the RAM (step #111).

The overall control unit 100 then determines whether or not imaging of all of the sections A through D has been completed (step #113). Since imaging has been completed only with regard to the section A in this example (NO in step #113), the overall control unit 100 returns to step #105, in which the imaging lens 21 is moved by the movement control unit 102 such that the optical axis Lx of the imaging optical system passes through the imaging center point (b) of the section B while the signals output from the position sensor 33 are monitored. Digital image data for the section B is then obtained in accordance with the sequence of steps #107 through #111. Digital image data is obtained in the same manner with regard to the sections C and D as well.

When digital image data for all of the sections A through D has been obtained (YES in step #113), the image synthesizer 105 reads the digital image data for the sections A through D stored in the ROM (step #115), compares the brightness distribution of the overlapping areas in the digital image data, looks for the overlapping image areas, and splices the images (step #117). Furthermore, after various image processing is performed where necessary, a single set of synthesized image data is output to a printer, for example (step #119), whereupon the imaging operation is ended.

A modified example of the embodiment explained above will now be explained. In the embodiment explained above, the imaging lens 21 was fixed to the rotor 31 of the moving mechanism 30 such that its optical axis L is separated from the normal line N that passes through the center of the area sensor 20 by a prescribed distance D1, but the present invention is not limited to this implementation. In the modified version shown in FIG. 7, for example, the imaging lens 21 comprises a zoom lens or two focal point lens, and the distance D1 between the optical axis L of the lens and the normal line N is variable.

Figure 7:
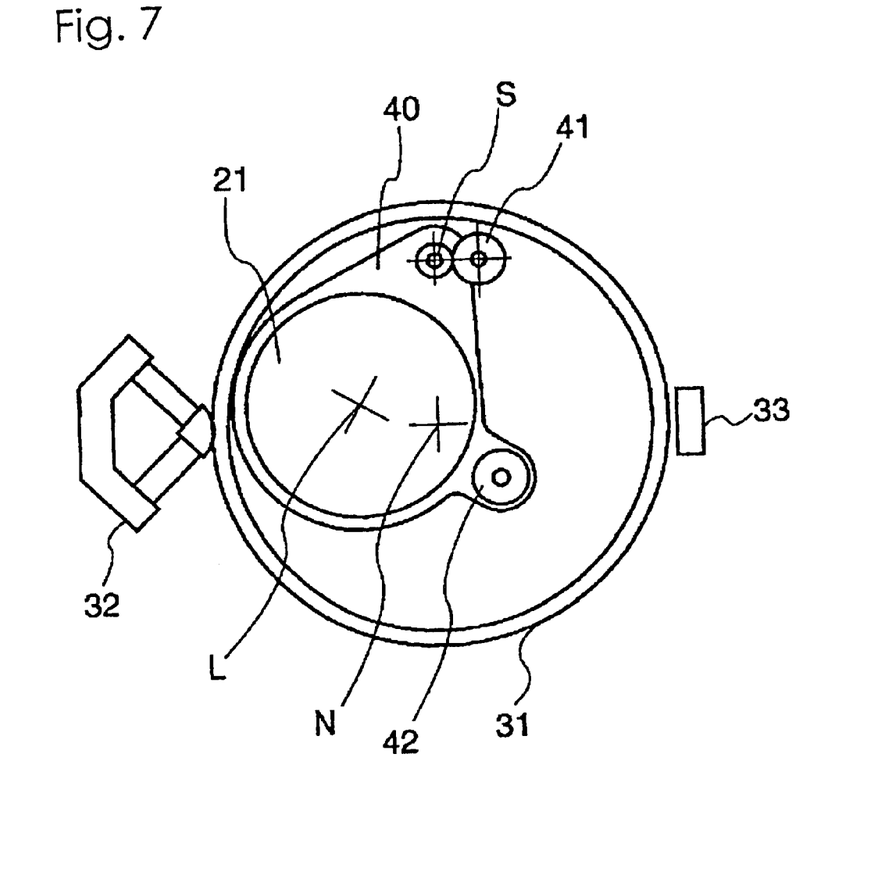
FIG. 7 is a plan view showing a modified example of the moving mechanism.
Figure 8A:
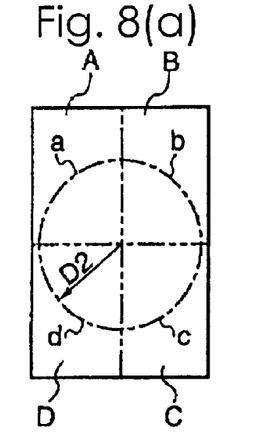
FIGS. 8(a), 8(b), 8(c), 8(d), 8(e) and 8(f) are simplified drawings showing variations of the imaging method using the modified version.
Figure 8B:
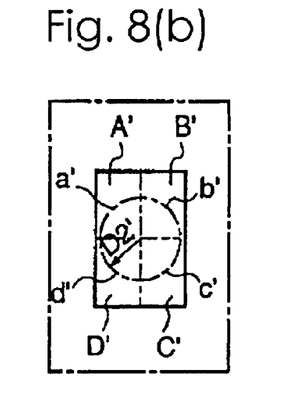
Figure 8C:
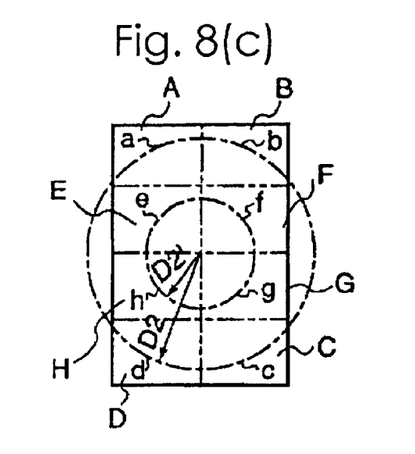
Figure 8D:
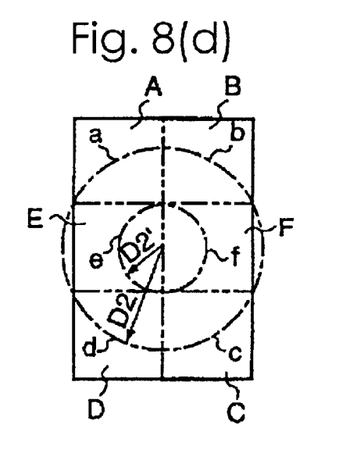
Figure 8E:
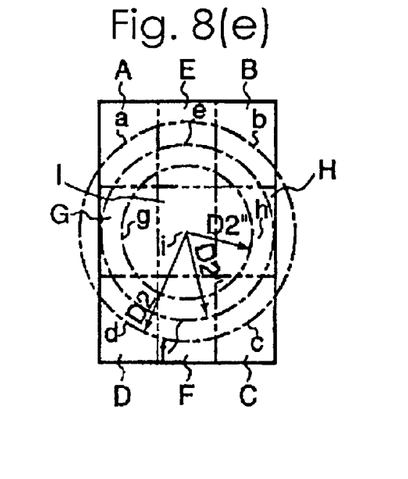
Figure 8F:
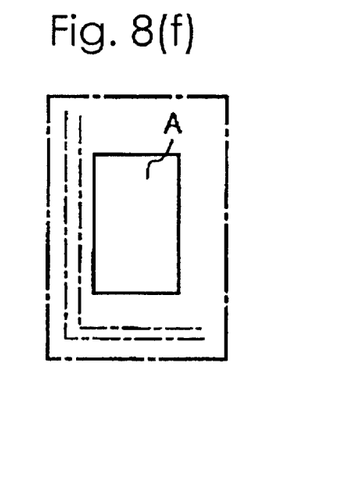

Specifically, a lens holder 40 that can revolve around the rotation shaft S and a revolving mechanism 41 to revolve the lens holder 40 are located on the rotor 31, and the imaging lens 21 and a driving mechanism 42 that changes the focal length of the imaging lens 21 are mounted on the lens holder 40. By means of this construction, and based on the angle of revolution of the lens holder 40, the distance between the optical axis L of the imaging lens 21 and the rotation shaft of the rotor 31, i.e., the distance D1 between the optical axis L and the normal line N that passes through the center of the area sensor 20, may be made variable. In particular, it is preferred that the locus of the arc drawn by the optical axis L of the imaging lens 21 around the rotation shaft S of the lens holder 40 pass through the normal line N, and that the optical axis L match the normal line N. In other words, by making it possible for the optical axis L of the imaging lens 21 to match the normal line N that passes through the center of the area sensor 20, many variations of the imaging method become available, as shown in FIG. 8.

FIG. 8(*a*) shows a case in which a photo object having essentially the maximum size that may be placed on the table 10 is divided into four sections A through D for imaging with a relatively high resolution, as in the basic example shown in FIG. 3. In this case, the area of each section A through D that undergoes imaging is relatively large, and the radius D2 of the circle that passes through the imaging center points (a) through (d) is long. Therefore, the focal length of the imaging lens 21 is made short (i.e., the imaging magnification is made small), and the distance D1 is increased.

On the other hand, FIG. 8(*b*) shows a case in which a small photo object is placed in the center of the table 10, and the photo object is divided into four even smaller sections A' through D' for imaging with an ultra-high resolution. In this case, the area of the section A' through D' that undergoes imaging is small, and the radius D2' of the circle that passes through the imaging center points (a) through (d) is short. Therefore, the focal length of the imaging lens 21 is made long (i.e., the imaging magnification is made large), and the distance D1 is made short. Comparing FIG. 8(*a*) and FIG. 8(*b*), the reciprocal of the ratio of the distances D1 essentially matches the ratio of the focal lengths of the imaging lenses.

FIG. 8(*c*) shows a case in which a photo object having essentially the maximum size that may be placed on the table 10 is divided into eight sections A through H for imaging with an ultra-high resolution. In this case, the area of each section A through H that undergoes imaging is quite small. Therefore, the imaging lens 21 is fixed at a position at which the focal length is long (i.e., the imaging magnification is made large). The imaging centers points (a) through (h) of the sections A through H are not located on the same circumference, but are located on the circumferences of two different circles having radii of D2 and D2', respectively. Therefore, imaging is performed by changing the distance D1 in two steps, i.e., by making the distance D1 long or short.

FIG. 8(*d*) shows a case in which a photo object having essentially the maximum size that may be placed on the table 10 is divided into six sections A through F for imaging with an ultra-high resolution. Because the area of each section A through F that undergoes imaging is relatively small, the imaging lens 21 is fixed at a position at which the focal length is slightly long (i.e., the imaging magnification is made large). In addition, because the imaging center points (a) through (f) of the sections A through F do not exist on the same circumference, but on the circumferences of two different circles having radii of D2 and D2', respectively, imaging is performed by changing the distance D1 in two steps, i.e., by making the distance D1 long or short.

FIG. 8(*e*) shows a case in which a photo object having essentially the maximum size that may be placed on the table 10 is divided into nine sections A through I for imaging with an ultra-high resolution. Because the area of each section A through I that undergoes imaging is quite small, the imaging lens 21 is fixed at a position at which the focal length is long (i.e., the imaging magnification is made large). In addition, because the imaging center points (a) through (i) of the sections A through I do not exist on the same circumference but on the circumferences of three different circles having radii of D2, D2' and D2", respectively, as well as the center O in the table 10, imaging is performed by changing the distance D1 in four steps, i.e., by making the distance D1 long, intermediate, short or zero.

FIG. 8(*f*) shows a case in which the optical axis L of the imaging lens 21 is made to match the normal line N that passes through the center of the area sensor 20, and the photo object placed in the center of the table 10 undergoes imaging based on one imaging operation while the focal length of the imaging lens 21 is adjusted appropriately. The time required for imaging may be reduced when the photo object is small in size and it is not necessary to divide it into multiple areas for imaging, or when high resolution is not needed.

The method for moving the imaging lens 21 in this modified version is not limited to the revolving of the lens holder 40 around the rotation shaft S. Instead, the lens holder 40 may be moved in a linear fashion, passing through the normal line N. Where the imaging lens 21 is a two focal point lens, the imaging magnifications available with the imaging lens 21 are known in advance, and the distance D1 between the optical axis L of the imaging lens 21 and the normal line N is also predetermined accordingly. Therefore, the control for causing the lens holder 40 to revolve may be achieved using a relatively simple construction by means of a stopper, for example. On the other hand, where the imaging lens 21 is a zoom lens, the imaging lens 21 may be set to any magnification, and the lens holder 40 must be stopped at a prescribed position in accordance with the specified magnification. In this case, the construction may be such that the focal length of the imaging lens 21 and the position of the lens holder 40 are controlled by means of a single motor using a cam, for example.

In the embodiment explained above, a truss-type piezoelectric actuator was used for the actuator 32, but the present invention is not limited to this implementation. A servomotor, stepping motor, or other type of actuator may be used instead. The position sensor 33 is also not limited to a magnetic sensor, and optical or other sensors may be used.

As explained above, since the imaging device of the present invention has an area sensor, an imaging lens that forms the photo object image on the area sensor, and a moving mechanism that moves the imaging lens in a direction perpendicular to its optical axis, and performs imaging of the photo object by stopping the imaging lens at multiple different imaging positions, the apparent number of pixels of the area sensor available to image the entire photo object may be increased, and therefore the resolution of the image obtained by splicing together the partial images of the sections of the photo object may be increased.

In particular, since the imaging sensor is fixed relative to the photo object and the imaging lens, which rotaries symmetrically relative to the optical axis, is moved relative to the photo object and the imaging element, the partial images of the photo object formed on the imaging element do not rotate, which makes the correction carried out during image splicing easier. Further, since the optical axis of the imaging optical system to form the photo object image on the imaging element is angled, but the photo object and the imaging element are maintained parallel to each other, blur and distortion of the photo object image formed on the imaging element may be made very small. Further, image processing during image splicing becomes easier, and it is also possible to increase the image processing speed.

Furthermore, because the amount of movement of the imaging lens is proportional to the imaging magnification of the imaging lens relative to the distance by which the optical axis actually moves on the photo object, the amount of movement of the imaging lens becomes very small, and as a result, it becomes possible to reduce the size of the moving mechanism, as well as that of the entire imaging device.

Moreover, by moving the imaging lens by means of the moving mechanism such that the optical axis of the imaging lens draws a circle that has as its center the normal line, which passes through the center of the imaging element, the moving mechanism may be made smaller, simpler in construction and less costly.

In addition, by equipping the imaging lens with a zoom lens and having the moving mechanism adjust the radius of the circle referred to above in response to the imaging magnification of the imaging lens, the image may be input using many variations in response to the size of the photo object and the resolution required of the final image. As a result, it is also possible to obtain an ultra-high resolution image.

Moreover, by using a table to hold the photo object that is parallel to the light receiving surface of the imaging element and a stopper to position the photo object, and by locating the stopper at a prescribed position using the imaging start position for the imaging lens as a reference, when the size of the photo object is about the same as or smaller than that of one of the imaging sections, imaging may be performed in a short period of time without image splicing.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An imagining device comprising:
   an imaging sensor;
   an imaging lens having an optical axis and for projecting an object image onto said imaging sensor;
   a moving mechanism for moving said imaging lens in a direction perpendicular to the optical axis of the imaging lens to change relative position between the imaging lens and the imaging sensor; and
   a controller for controlling said moving mechanism so that said imaging lens is moved to a plurality of imaging positions, wherein
   the object image is captured at each of the imaging positions in order to obtain image data of a plurality of partial images to be combined to obtain the entire image.

2. The imaging device as claimed in claim 1, wherein said moving mechanism moves said imaging lens in a circle having as its center the center of the imaging sensor.

3. The imaging device as claimed in claim 2, wherein said imaging lens includes a zoom lens and said moving mechanism adjusts a radius of the circle based on the imaging magnification of the imaging lens.

4. The imaging device as claimed in claim 1, further comprising a table for supporting the object image, and a stopper for positioning the object image at a prescribed position on the table, wherein
   the prescribed position and the imaging position have a certain positional relationship at all times.

5. The imaging device as claimed in claim 1, further comprising a image synthesizer for combining said plurality of partial images to obtain the entire object image.

6. The imaging device as claimed in claim 1, wherein said imaging sensor is an area, image sensor.

7. The imaging device as claimed in claim 6, wherein said said moving mechanism moves said imaging lens in a circle having as its center the center of the imaging sensor.

8. The imaging device as claimed in claim 7, wherein said imaging lens includes a zoom lens and said moving mechanism adjusts a radius of the circle based on the imaging magnification of the imaging lens.

9. The imaging device as claimed in claim 6, further comprising a table for supporting the object image, and a stopper for positioning the object image at a prescribed position on the table, wherein the prescribed position and the imaging position have a certain positional relationship at all times.

10. The imaging device as claimed in claim 6, further comprising a image synthesizer for combining said plurality of partial images to obtain the entire object image.

11. The imaging device as claimed in claim 1, wherein the imaging lens moves linearly and nonlinearly.

12. The imaging device as claimed in claim 1, wherein the imaging sensor is fixed relative to the object.

13. The imaging device as claimed in claim 1, wherein the imaging lens includes a zoom lens and said moving mechanism adjusts a moving distance of the imaging lens based on an imaging magnification of the imaging lens.

14. An imagining method for capturing an object image, said method comprising:

projecting a part of an object image onto an area imaging sensor via a imaging lens having an optical axis;

capturing said part of an object image by the area imaging sensor to obtain a partial image data;

moving the area imaging sensor in a direction perpendicular to the optical axis of the imaging lens to change relative position between the imaging lens and the imaging sensor;

capturing said one of the other parts of the object image by the area imaging sensor to obtain a partial data; and synthesizing a plurality of partial image data to obtain the image data of the entire object image.

15. The imaging method as claimed in claim 14, wherein said imaging lens is moved in a circle having as its center the center of the area imaging sensor.

16. The imaging method as claimed in claim 15, wherein said imaging lens includes a zoom lens and a radius of the circle is adjusted based on the imaging magnification of the imaging lens.

17. The imaging method as claimed in claim 14 wherein said object image is supported on a table upwardly and the said area imaging sensor is positioned above said table.

18. An imagining device comprising:

an imaging sensor;

an imaging lens having an optical axis and for projecting an object image onto said imaging sensor;

a moving mechanism for moving said imaging lens in two-dimensional directions in a plane perpendicular to the optical axis of the imaging lens; and a controller for controlling said moving mechanism so that said imaging lens is moved to a plurality of imaging positions, wherein the object image is captured at each of the imaging positions in order to obtain image data of a plurality of partial images to be combined to obtain the entire image.

* * * * *